(12) United States Patent
Cagner

(10) Patent No.: US 9,259,127 B2
(45) Date of Patent: Feb. 16, 2016

(54) PIPE COUPLING

(75) Inventor: Björn Cagner, Sävedalen (SE)

(73) Assignee: Roland Artur Stanger, Metzingen (DE)

( * ) Notice: Subject to any disclaimer, the term of this patent is extended or adjusted under 35 U.S.C. 154(b) by 675 days.

(21) Appl. No.: 12/936,970

(22) PCT Filed: Apr. 9, 2008

(86) PCT No.: PCT/SE2008/050406
§ 371 (c)(1),
(2), (4) Date: Feb. 7, 2011

(87) PCT Pub. No.: WO2009/126076
PCT Pub. Date: Oct. 15, 2009

(65) Prior Publication Data
US 2011/0148106 A1 Jun. 23, 2011

(51) Int. Cl.
*F16L 47/08* (2006.01)
*A47L 5/38* (2006.01)
(Continued)

(52) U.S. Cl.
CPC . *A47L 5/38* (2013.01); *A47L 9/242* (2013.01); *F16L 21/03* (2013.01); *F16L 47/10* (2013.01); *B29C 45/1676* (2013.01); *B29L 2031/24* (2013.01)

(58) Field of Classification Search
CPC .................................. F16L 47/08; F16L 47/10
USPC ........................... 285/374, 399–400, 7, 294.3
See application file for complete search history.

(56) References Cited

U.S. PATENT DOCUMENTS 2,075,483 A * 3/1937 Trotter .......................... 285/374
3,212,795 A * 10/1965 Humphrey et al. ............... 285/7
(Continued)

FOREIGN PATENT DOCUMENTS

CA    2 531 781 A1    3/2007
EP    0 179 950 A1    5/1986
(Continued)

OTHER PUBLICATIONS

International Search Report (PCT/ISA/210) for PCT/SE2008/050406 dated Oct. 8, 2008.
(Continued)

*Primary Examiner* — David E Bochna
(74) *Attorney, Agent, or Firm* — Buchanan Ingersoll & Rooney P.C.

(57) ABSTRACT

A pipe coupling for a central vacuum cleaning pipeline is adapted to be connected with at least one pipe to form a central vacuum cleaning pipe line. The pipe coupling comprises at least a first and a second opening defined by an envelope wall, the envelope wall comprises an inner and an outer surface, wherein at least said first opening is arranged to receive a pipe introduced into the first opening along a first insertion and retraction direction, so that the pipe coupling overlaps the pipe with a part of the inner surface of the pipe coupling at an attachment section. The attachment section comprises in turn an annular seal member arranged in the attachment section to effectively seal between the inner surface of the pipe coupling and the outer surface of said pipe. The attachment section further comprises an annular recess which defines a stop surface. The annular recess is configured to form a smooth transition between the pipe and the pipe coupling. A manufacturing method for the pipe coupling is also described.

15 Claims, 5 Drawing Sheets

(51) Int. Cl.
*A47L 9/24* (2006.01)
*F16L 21/03* (2006.01)
*F16L 47/10* (2006.01)
*B29L 31/24* (2006.01)
*B29C 45/16* (2006.01)

(56) References Cited

U.S. PATENT DOCUMENTS

| | | | | |
|---|---|---|---|---|
| 3,262,718 | A | * | 7/1966 | Draudt ................................ 285/7 |
| 3,315,970 | A | * | 4/1967 | Holoway ........................ 285/374 |
| 3,916,502 | A | * | 11/1975 | Bagnulo ........................ 285/374 |
| 4,410,479 | A | * | 10/1983 | Cyriax ........................... 264/255 |
| 4,625,998 | A | * | 12/1986 | Draudt et al. ...................... 285/7 |
| 4,664,421 | A | * | 5/1987 | Jones ............................. 285/423 |
| 4,747,179 | A | * | 5/1988 | Berfield .............................. 285/7 |
| 5,547,230 | A | * | 8/1996 | Bank et al. .................... 285/423 |
| 6,176,523 | B1 | * | 1/2001 | Winslett ........................ 285/374 |
| 6,182,326 | B1 | * | 2/2001 | Rhea et al. ......................... 285/7 |
| 8,579,334 | B2 | * | 11/2013 | Schnallinger et al. ........ 285/374 |
| 8,678,449 | B2 | * | 3/2014 | Zepp et al. .................... 285/374 |
| 2004/0250371 | A1 | | 12/2004 | Ambrose |
| 2005/0242571 | A1 | | 11/2005 | Houghton et al. |

FOREIGN PATENT DOCUMENTS

| | | |
|---|---|---|
| EP | 0 326 719 A1 | 8/1989 |
| EP | 1 715 237 A2 | 10/2006 |
| GB | 2 360 484 A | 9/2001 |
| WO | 01/70480 A1 | 9/2001 |

OTHER PUBLICATIONS

International Preliminary Report on Patentability (PCT/IPEA/409) for PCT/SE2008/050406 dated Mar. 25, 2010.

Extended European Search Report dated Apr. 15, 2014, issued by the European Patent Office in corresponding European Patent Application No. 08741896.8 - 1712 /2276385. (6 pages).

* cited by examiner

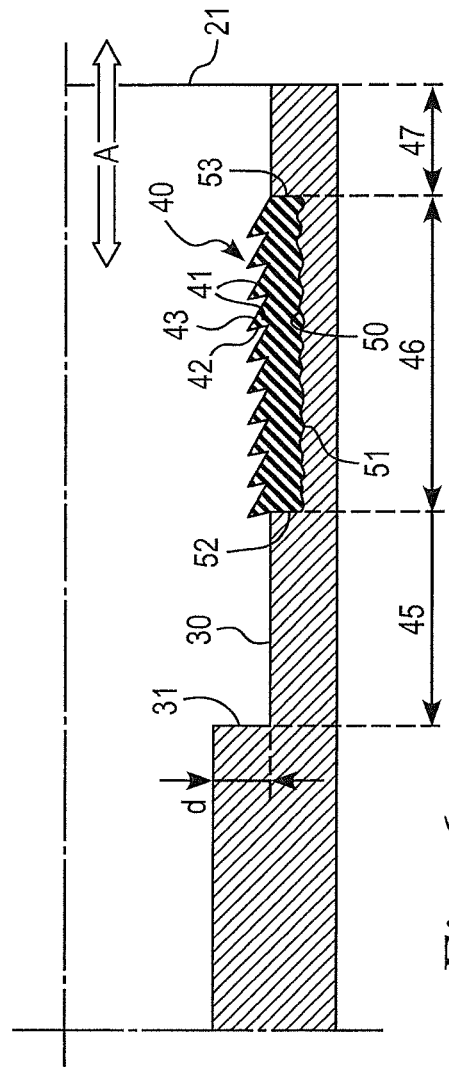

PIPE COUPLING

TECHNICAL FIELD

The present invention relates to a pipe coupling for connecting with at least one pipe for assembly of a vacuum pipeline, and a method of manufacturing a pipe coupling. More specifically is the pipe coupling for connecting with a pipe to form a central vacuum cleaning pipeline.

BACKGROUND OF THE INVENTION

Central vacuum cleaning systems are widely used in a number of different facilities such as stables, warehouses, hotels, and private accommodations. Vehicles such as trains, airplanes, busses and boats are also subject for the implementation of central vacuum cleaning systems. Generally such central vacuum cleaning systems are assembled during the construction of the building or the vehicle, however not so uncommon; a central vacuum cleaning system can be installed afterwards by tearing down parts of the walls, ceilings or floors to incorporate the pipelines of the vacuum cleaning system. In either case, the assembling of the pipeline, which in almost all cases extends inside the walls, ceilings or floors are in most cases done under a tight time schedule. Clients pay per hour or in cases where a fixed rate is set, the installer of the system is driven to minimize the installation time for optimizing the profit. These driving forces tend to increase the demand for quality control and the demand on equipment to be easy and flexible to install. Such equipment can be pipelines which are easy and flexible to install, which do not leak and which provide an installer with the possibility to make amendments after installation, e.g. if some item or the installation is proven to be defect.

Additionally, one of the reasons which central vacuum cleaning systems is widely used is that they provide a quiet vacuum cleaning, with substantially no air contamination. The main reason for this being that the central vacuum cleaning unit, which suck air, is not arranged in the same room as where the actual cleaning takes place. It should be noted however, that these cleaning systems are not silent; indeed there is what can be called a noise pollution due to turbulent air flow through the pipelines. The turbulence, and the noise pollution, is affected by the couplings, air flow velocity, pipeline flow resistance and dimensions of the pipelines, pipe isolation etc. However, the above mentioned issues seem to not yet have been properly solved by the industry.

One attempt to provide pipes which provide tight seals is described in the publication of U.S. Pat. No. 5,547,230, in which a force transmitting joint is formed between two pipe sections. The pipe ends comprise a variable wall thickness so that they can be joined with mating pipe ends. Although the solution is said to provide a tight seal, the solution do not provide for a sufficiently low noise pollution, with respect to fluid flow through the pipelines. Further in U.S. Pat. No. 4,664,421 is a leak resistant pipe joint provided to joint plastic pipes of at least four inches in diameter. The pipe joint comprises a flexible gasket with projecting ribs. The solution seems to provide for a tight seal, but lack solutions and the insight of providing a low noise fluid flow through the pipeline.

Other existing vacuum pipe lines and pipe couplings uses PVC pipes and PVC pipe couplings. Adhesive is used to attach the pipes and the pipe couplings. Not only is PVC an environmentally less desired material, the adhesive complicates the assembly of the pipes. It has been shown that adhesive connections are more susceptible to noise pollution than adhesive free connections. The main reason being that adhesive have a tendency to protrude out from the connection (between the pipe and the pipe coupling) and into the pipe, when the pipe and the pipe coupling is pushed together.

It is an object of the present invention to at least partly solve the above mentioned drawbacks. More specifically it is an object of the present invention to at least partly provide a solution with reduces the noise of fluid flow in the pipelines, while at the same time partly provides a pipe coupling which enables easy and flexible assembly of a vacuum pipe line.

SUMMARY OF THE INVENTION

The above problems are at least partly solved by a pipe coupling according to the present invention. More specifically are they at least partly solved by a pipe coupling for a central vacuum cleaning pipeline, adapted to be connected with at least one pipe, the pipe comprises an inner and an outer surface. The pipe coupling comprises at least a first and a second opening defined by an envelope wall, the envelope wall comprises an inner and an outer surface. At least the first opening is arranged to receive a pipe introduced into the first opening along a first insertion and retraction direction, so that the pipe coupling overlap the pipe with a part of the inner surface of the pipe coupling at an attachment section. The attachment section comprises an annular seal member arranged on the attachment section to seal between the inner surface of the pipe coupling and the outer surface of the pipe. The attachment section further comprises; a stop surface defined by an annular recess extending around the periphery of the inner surface of the pipe coupling, the annular recess extends a first distance D from the first opening into the pipe coupling. The stop surface is configured to stop the pipe from insertion along the insertion and retraction direction. Additionally, the annular recess comprises a depth d to substantially align the inner surface of the pipe coupling with the inner surface of the pipe after assembly, so as to provide a substantially smooth transition between the pipe coupling and the pipe. The present invention provides for a low noise pollution when fluid flow through the assembled pipe line. The pipe couplings are specifically arranged to connect to a pipe without the use of additional substances such as adhesive, thereby provide for a pipe coupling which is easy to connect and install. Further, any pipe length can be cut to fit with the pipe coupling; hence the present invention is very flexible in terms of installation and assembly of a pipe line. Further advantages with the present invention will be evident when reading the description below.

In an embodiment of the present invention, the annular recess comprises a second annular recess wherein the annular seal member is arranged in the second annular recess. The present embodiment provides for a safe pipe coupling which can be assembled and thereafter disassembled by insertion and retraction of a pipe without risking to remove or fold the annular seal member when inserting, or even more specifically, when retracting a pipe out from the pipe coupling. This feature has been shown to be specifically valuable if the pipe coupling is assembled or disassembled directly after the pipe coupling has been manufactured. The second annular recess holds the seal member in its position; it further gives the annular seal member a larger attachment section with respect to the inner surface of the envelope wall of the pipe coupling. It has further been shown to be an important feature if the pipe coupling is manufactured by injection moulding.

Advantageously is the second annular recess arranged between the first opening of the pipe coupling and the stop surface of the attachment section, so that an annular flange is provided between the second annular recess and the first opening. The annular flange can in a sense guide a pipe into the opening to prevent the end of a pipe to accidentally push the annular seal member out from position. However, not only does such annular flange improve the annular seal members retaining properties, such an annular flange will provide for a firmer, and safer coupling between a pipe and a pipe coupling according to the present invention. The annular flange can absorb bending forces imparted to a connected pipe, to thereby reduce the risk of leakage. The feature is enhanced if the second annular recess is arranged closer to the first opening than to the stop surface. The annular flange preferably comprises a length L in the range of 1-5 mm, preferably between 1-3 mm. Although this feature is described as a flange it is important to note that the annular flange should preferably not extend beyond, i.e. out of the plane, of the inner surface of first annular recess of the attachment section.

To provide a good stabilizing section, the annular recess is preferably arranged at a distance from the stop surface which is about at least half the width of the annular seal member, or at least equal to the width of the annular seal member. The annular recess can also preferably be arranged at a second distance from the stop surface which is in the range of 5-25 mm, preferably between 7-20 mm. These last mentioned dimensions have been found to be extra beneficial when pipe dimensions of 50.8 mm is used.

As mentioned above, the attachment section comprises an annular recess extending around the periphery of the inner surface of the pipe coupling. A pipe is during assembly intended to be pushed into the annular recess of the attachment section along an insertion and retraction direction. The annular recess extends a first distance from the first opening into the pipe coupling, preferably such a first distance is in the range of 10-40 mm. Such a first distance may however be at least twice the distance of the width of the annular seal member. The first distance of the first annular recess provides for a safe coupling between a pipe and the pipe coupling.

In a preferred embodiment of the present invention, the pipe coupling is made from a thermoplastic elastomeric (TPE) material and the pipe coupling is made from a plastic material.

In an embodiment of the present invention, the pipe coupling comprises at least one hole through the envelope wall of the pipe coupling, the through hole extends from the outer surface of the envelope wall to the inner surface of the envelope wall, wherein the hole exits at the attachment section. Such a trough hole has been shown to provide for a very accurate and efficient way to manufacture a pipe coupling according to the present invention. The annular recess may further comprise a second annular recess, wherein the hole exists in the second annular recess. In this embodiment is all of the above advantages of the second annular recess combined with the advantageous properties of using a though hole, as mentioned above. Additionally or optionally the seal member can be attached to the second annular recess by means of at least partly mold the seal member into the second annular recess through the hole.

A pipe coupling according to the present invention can comprise one, two, three, four, five or more openings with an attachment section as described above for attaching a pipe. It is preferably connected to at least one pipe to form a vacuum cleaning pipeline, which in turn preferably is connected to a vacuum cleaning unit.

The present invention further relates to a manufacturing method for a pipe coupling. The pipe coupling according to the manufacturing method, comprises an annular seal member which defines a seal section and an envelope wall which comprises a through hole arranged in communication with the seal section. The method comprises the steps of; Providing a first material and injection molding the envelope wall of the pipe coupling; Providing a second material and injection molding the seal member;

Wherein the seal member is injection molded trough the through hole. The manufacturing method provides for an efficient way of manufacturing a pipe coupling according aspects of the present invention. The seal member can be molded in a subsequent step after molding the envelope wall of the pipe coupling or simultaneously.

BRIEF DESCRIPTION OF THE DRAWINGS

The present invention will be described in greater detail with reference to the accompanying figure, wherein;

FIG. 6 shows a cross section of parts of the attachment section of a second embodiment of the pipe coupling shown in FIG. 3.

DETAILED DESCRIPTION OF PREFERRED EMBODIMENTS

Figure 1:
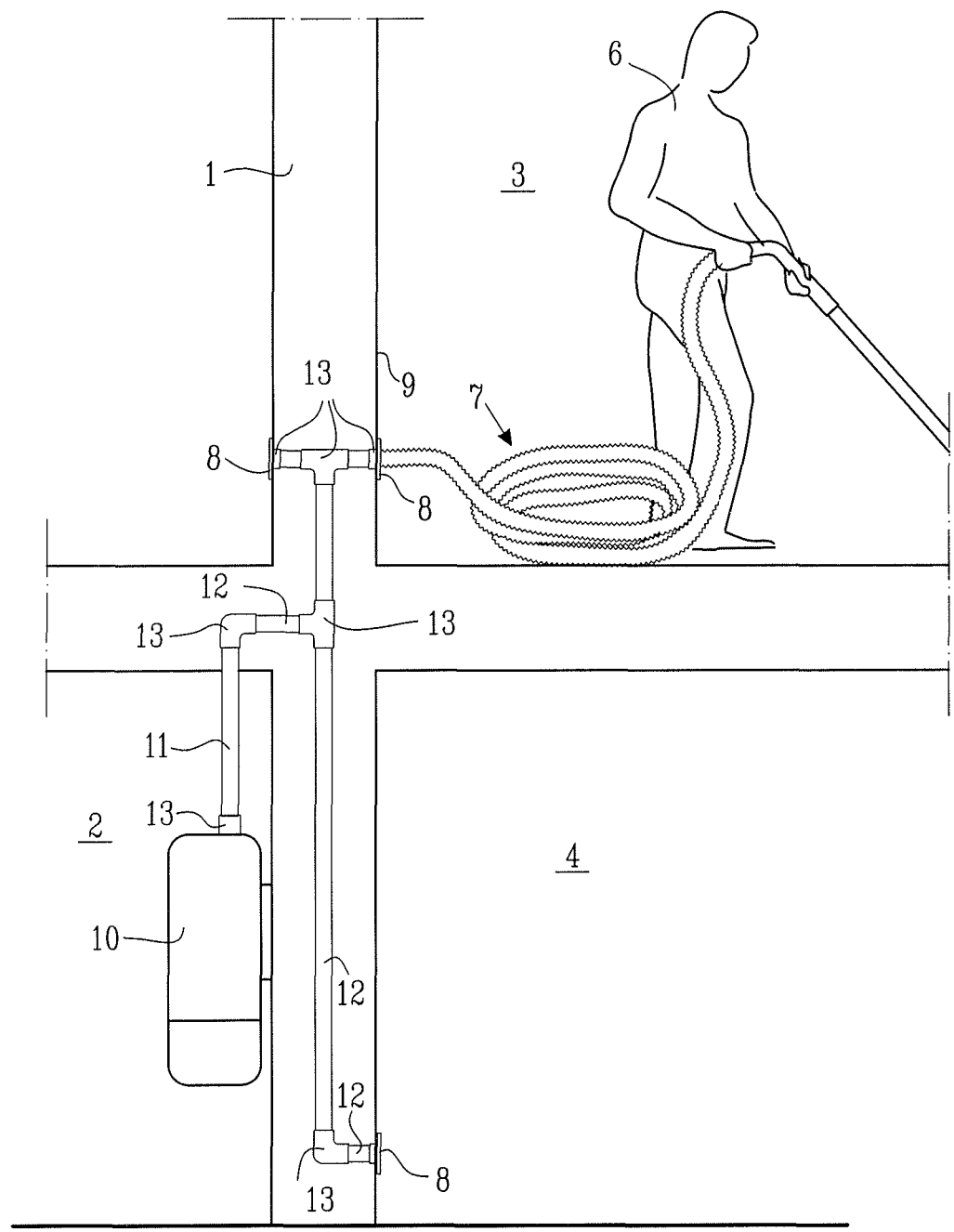
FIG. 1 shows a schematic overview of a central vacuum unit connected to a central vacuum pipeline arranged in parts of a building.

In FIG. 1 parts of a building is shown with walls 1 and a plurality of rooms 2, 3, 4. A central vacuum unit 10 is arranged in a first room 2, and is connected to a vacuum pipeline 11. The vacuum pipeline extends from the central vacuum unit 10 in the first room 2, into the walls 1, to thereafter exit in a third and a fourth room 3, 4. A user 6 has connected a vacuum hose 7 to a vacuum pipeline exit 8 arranged at a wall surface 9, the wall surface 9 being the surface which faces towards the second room 3. The user 6 may thereafter conveniently vacuum clean the second room 3, or any other appropriate room. The vacuum unit 10 is arranged to suck air with a flow of about 200 m$^3$/h, with a power consumption of about 1.7 kW. Although the terms vacuum unit is used, a normal working air pressure is in the order of 200 mbar, hence the prime technical field of the present invention is for vacuum pipelines with an air pressure of less than 1 bar.

The vacuum pipeline 11 comprises a plurality of pipes 12 and a plurality of pipe couplings 13, according to the present invention. The plurality of pipes 12 comprises different lengths and has been cut during the assembly to fit the required length. Each pipe 12 has a diameter of about 50.8 mm and is made form polypropylene. The pipes 12 are suitably formed to be rigid; preferably are they formed from thermoplastic material such as polyethylene, polypropylene, polystyrene, polyurethane, polyvinyl chloride or the like.

Figure 2:
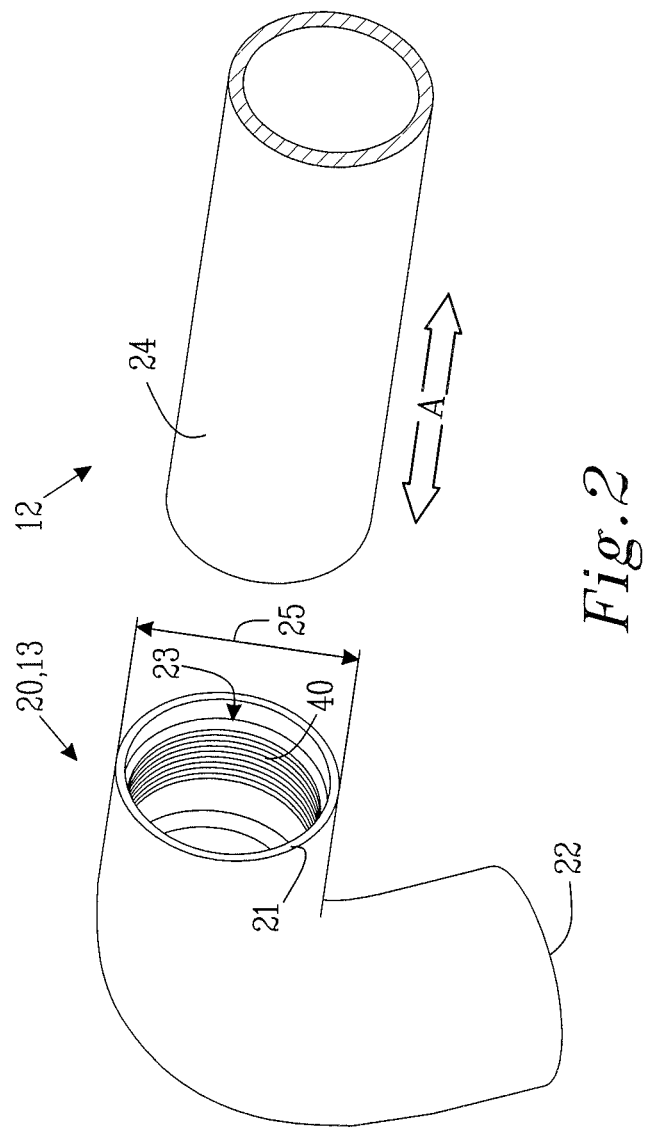
FIG. 2 shows a 90° turn pipe coupling, according to one embodiment of the present invention, before connecting with a pipe.

Hereafter will a pipe coupling, according to the present invention, be described in greater detail. In FIG. 2 is a pipe coupling 13, according to one embodiment of the present invention, described together with a part of a pipe 12. FIG. 2 shows a 90° turn pipe coupling 20 comprising a first and a second opening 21, 22. The first and the second opening 21, 22 are identical in terms of dimensions and features, although this is not necessary. Only the first opening 21 will be described hereafter. The first opening 21 comprises an attachment section 23, on the inside of the pipe coupling 20, which is arranged to receive and attach a first end 24 of a pipe 12. The first end 24 of the pipe 12 is intended to be partly inserted, with respect to the longitudinal direction of the pipe 12, along an insertion and retraction direction A into the first opening 21 of the pipe coupling 20.

Figure 3:
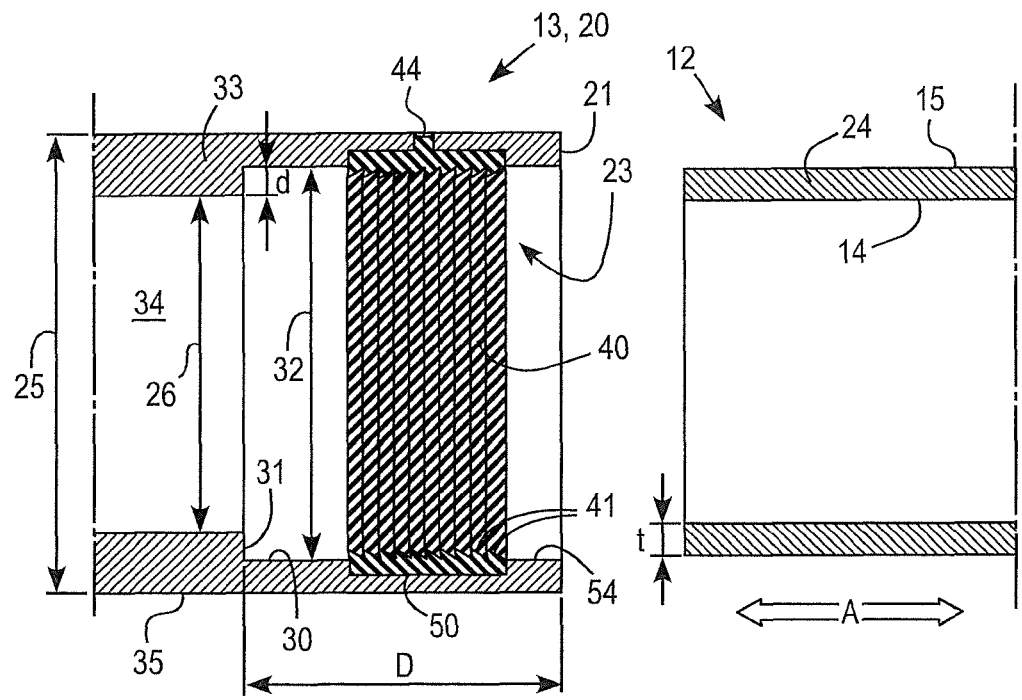
FIG. 3 shows a cross section of parts of the pipe coupling and the pipe shown in FIG. 3.

FIG. 3 shows a cross section of a part of the pipe coupling 20 with an envelope wall 33, as shown in FIG. 2, and the attachment section 23, together with the first end 24 of the pipe 12, in greater detail. The pipe coupling 20 comprises an outer diameter 25, a first inner diameter 26. The attachment section 23 is comprises a first annular recess 30 which defines a stop surface 31. The first annular recess 30 extends a depth d into the envelope wall 33 of the pipe coupling 20. The first annular recess 30 extends a distance D from the first opening 21 of the pipe coupling 20 into the pipe coupling 20. As is evident form the above description, the first annular recess 30 comprises a second inner diameter 32 which is less than the first inner diameter 26 of the pipe coupling 20. The pipe coupling 20 further comprises an inner and an outer surface 34, 35.

The attachment section 23 further comprises an annular seal member 40 extending around the periphery of the first annular recess 30 on the inner surface 34 of the pipe coupling 20. Due to the required seal properties of the annular seal member 40, materials such as thermoplastic elastomers (TPE) are preferably used. Examples of such TPE are e.g. based on styrene, olefin, urethane, esters, amides or the like. Other suitable materials are natural rubber, styrene rubber, urethane rubber or the like. Any functional mixture of the above may also be suitable.

Figure 4:
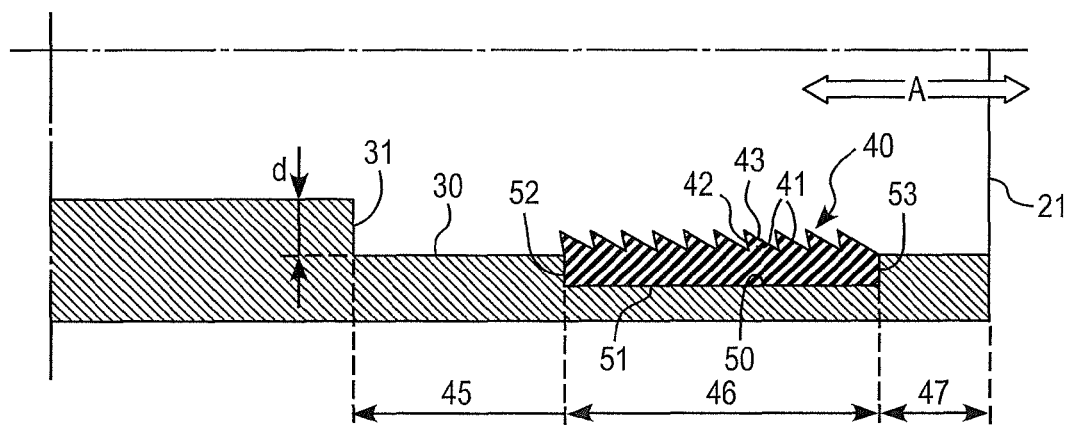
FIG. 4 shows a cross section of parts of the attachment section of the pipe coupling shown in FIG. 3.

The annular seal member 40 is, in the shown embodiment of the present invention, arranged in a second annular recess 50 which extends around the periphery of the first annular recess 30 of the pipe coupling 20. As can be seen in FIG. 3, the annular seal member 40 comprises a plurality of protrusions 41 in the form of saw tooth. The protrusions 41 comprise a perpendicular surface 42 and one angled surface 43, as is shown in greater detail in FIG. 4. FIG. 4 shows a part of the coupling pipe 20 as shown in FIG. 3. With the terms perpendicular surface is meant a surface substantially perpendicular to the insertion and retraction direction A, and with the term angled surface is meant a surface which is substantially not perpendicular, so at to form a substantially saw toothed form. FIG. 4 further shows the second annular recess 50 in the form of a recess with a flat base 51 comprising a first and a second substantially perpendicular wall 52, 53. In other embodiments of the present invention, the second annular recess may comprise a form with a radial curvature (not shown) or the first wall is arranged with an angle while the second wall is substantially perpendicular, with respect to the insertion and retraction direction A. In the shown embodiment of the present invention, the insertion and retraction direction A is equivalent with a longitudinal direction of the pipes 12.

As is illustrated in FIG. 4, the annular recess 30, which defines the stop surface 31 can be divided into a first, a second, and a third section 45, 46, 47, the sum of these sections being equal to the distance D, i.e. the extension of the first annular recess 30, as illustrated in FIG. 3. The first section 45 extends from the stop surface 31 to the annular seal member 40, or equivalently, in this embodiment, the second annular recess 50 and serve the purpose of stabilizing the first end 24 of a pipe 12 after insertion into the first opening 21 of the pipe coupling 20. Full stabilization is achieved when the first end 24 of the pipe 12 is pushed adjacent to the stop surface 31 so that substantially no play exists between the first end 24 of the pipe 12 and the stop surface 31 of the attachment section 23. In this sense is the first section 45 a stabilizing section. In practice it has been shown that when a pipe is cut there it is seldom cut with a 100% straight cut, hence at least a portion of the first end 24 of the pipe 12 should be positioned adjacent the stop surface 31.

The second section 46 is a sealing section. The purpose of the second section 46 is to seal between the inner surface 34 at the attachment section 23 of the pipe coupling 20 and the outer surface of the first end 24 of the pipe 12. The sealing is thereby done without using adhesive or other additives during assembly of the pipeline 11.

The third section 47 is a holding section. The purpose of the third section 47 is to form an annular edge around the periphery of the second annular recess 50 so that the annular seal member 40 is firmly held in place in the second annular recess 50 when inserting the first end 24 of the pipe 12, but especially when retracting the pipe 12 so that the first end 24 of the pipe 12 is removed form the pipe coupling 20.

As mentioned above, the stop surface 31 of the attachment section 23, defined by the first annular recess, comprises a depth d. One important advantage of the present invention is that the depth d is arranged to be substantially equally to a thickness t of the pipe 12. Further is the inner diameter 32 of the first recess 30 just somewhat smaller than an outer diameter of the first end 24 of the pipe 12, so that a snugly fit is provided between the pipe coupling 20 and the pipe 12. As a consequence is a smooth transition achieved between the pipe 12 and the pipe coupling 20. A smooth transition decreases the turbulence of flowing air in the vacuum pipeline 11 which thereby reduces noise. It further saves energy since it permits the central vacuum unit 10 to run with a slightly lower effect.

Figure 5:
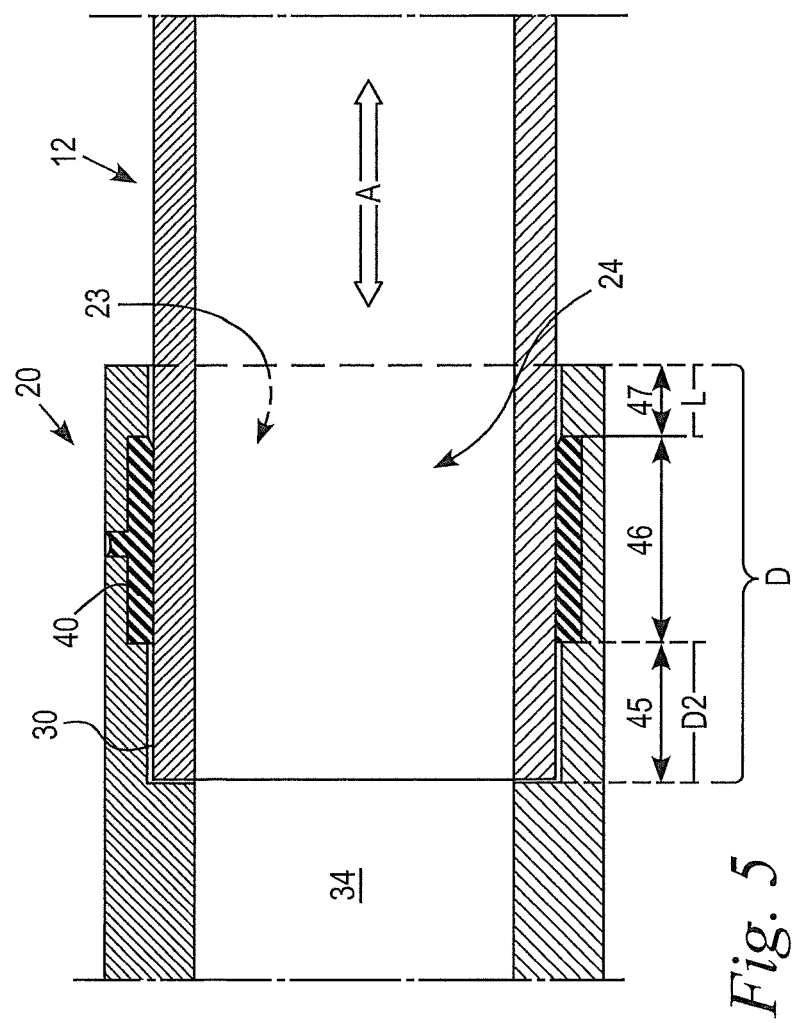
FIG. 5 shows a cross section of parts of the pipe coupling and the pipe shown in FIG. 3 after assembly.

FIG. 5 shows the pipe coupling 20 and the first end 24 of the pipe 12 after assembly. As can bee seen, the attachment section 23 is fully utilized to attach the first end 24 of the pipe 12 to the pipe coupling 12 without using any adhesive, instead is the pipe 12 held in place by the sealing member 40 and the snugly fit between the inner surface 34 of the first annular recess 30 and the outer surface of the pipe 12. A smooth transition, substantially without play, between the pipe coupling 20 and the first end 24 of the pipe 12 provides for a reduction in air turbulence during suction, more specifically is the smooth transition accomplished by aligning the inner diameter 26 of the pipe coupling 20 with the inner diameter of the pipe 12, by means of configuring the depth d, defined by the first annular recess 30.

A preferred way to attach and form the annular seal member 40 is to injection mold the annular seal member 40 into the second annular recess 30, although other methods are possible such as using adhesive, or the like. The present invention provides for an adhesive free system, in terms of assembling the pipeline 11, i.e. the pipe couplings 20 and the pipes 12. When injection molding is used as manufacturing method, the system is fully adhesive free. Turning back to FIG. 3, FIG. 3 shows a through hole 44 arranged through the envelope wall 33 of the pipe coupling 20. The through hole 44 is in the shown embodiment of the present invention an injection mold hole. The through hole 44 comprises a diameter of about 1-7 mm, preferably between 2-5 mm. The through hole 44 is in communication with the second annular recess 50, and thereby the second section 46. The envelope wall of the pipe coupling 20 is injection molded in a first material, wherein the annular seal member is injection molded in a second material. Either is the annular seal member 40 injection molded together with the envelope wall 33 of the pipe coupling 20 or in a subsequent step of the manufacturing method dependent on which kind of injection mold tool that is used.

FIG. 6 shows a part of s second embodiment of the pipe coupling 20 as shown in FIG. 3. In this embodiment the annular seal member 40 has at least partly melted together with the pipe coupling and more specifically in the second annular recess 50. Instead of the flat base 51, as shown in FIG. 4, the interface between the annular seal member 40 and the second annular recess 50 is diffuse and no exact boundary can be seen (illustrated by the wave formed line in FIG. 6) as the annular seal member 40 has mixed with the material of the pipe coupling 20. A thermoplastic elastomeric material is used to form the annular seal member 40 while the pipe coupling is made from a plastic material. The respective materials is selected so that each melting point of respective material is substantially similar, at least close enough for the materials to melt together. This enhances the attachment of the annular seal member 40 to the pipe coupling and permits the insertion and retraction of a pipe without the annular seal member 40 being removed or accidentally displaced during such manoeuvre.

The invention claimed is:

1. A central vacuum cleaning pipeline comprising a pipe coupling piece and at least one pipe, said pipe comprises an inner and an outer surface, said pipe coupling piece comprises at least a first and a second opening defined by an envelope wall, said envelope wall comprises an inner and an outer surface,
   at least one of said first and second openings comprises an attachment section having an annular seal member arranged in said attachment section, said attachment section further comprises:
   a stop surface defined by a first annular recess extending around the periphery of said inner surface of said pipe coupling piece, said first annular recess extends a first distance from said first opening into said pipe coupling piece, said stop surface is configured to prevent said pipe from insertion greater than a predetermined distance along an insertion and retraction direction, and said first annular recess comprises a depth to align said inner surface of said pipe coupling piece with said inner surface of said pipe after assembly, so as to provide a smooth transition between said pipe coupling piece and said pipe;
   the at least one of said first and second openings is arranged to receive said pipe introduced into said at least one of said first and second openings along the insertion and retraction direction, so that said pipe coupling piece overlaps said pipe with a part of said inner surface of said pipe coupling piece at said attachment section, so that said annular seal member is arranged to seal between said inner surface of said pipe coupling piece and said outer surface of said pipe after assembly;
   wherein said pipe coupling piece comprises at least one hole through said envelope wall of said pipe coupling piece, extending in a radial direction from said outer surface of said envelope wall directly to said inner surface of said envelope wall;
   wherein said first annular recess comprises a second annular recess, the annular seal member being arranged in said second annular recess;
   wherein the hole exits in said second annular recess, said second annular recess having an extension corresponding to an extension of said annular seal member wherein said annular seal member overlaps said at least one hole in a longitudinal direction of the pipe coupling piece; and
   wherein said second annular recess is arranged between said first opening of said pipe coupling piece and said stop surface of said attachment section, so that an annular flange is provided between said second annular recess and said first opening.

2. The central vacuum cleaning pipeline according to claim 1, wherein said second annular recess is arranged closer to said first opening than to said stop surface.

3. The central vacuum cleaning pipeline according to claim 2, wherein said annular flange comprises a length in the range of 1-5 mm.

4. The central vacuum cleaning pipeline according to claim 2, wherein said annular flange comprises a length in the range of 1-3 mm.

5. The central vacuum cleaning pipeline according to claim 1, wherein said annular recess is arranged at a second distance from said stop surface in the range of 5-25 mm.

6. The central vacuum cleaning pipeline according to claim 1, wherein said first distance is in the range of 10-50 mm.

7. The central vacuum cleaning pipeline according to claim 1, wherein said annular seal member is made from a thermoplastic elastomeric material and in that said pipe coupling piece is made from a plastic material.

8. The central vacuum cleaning pipeline according to claim 7, wherein said annular seal member is at least partly melted together with attachment section to thereby attach said annular seal member at said attachment section.

9. The central vacuum cleaning pipeline according to claim 1, wherein said seal member is attached to said second annular recess by means of at least partly mold said seal member into said second annular recess through said hole.

10. The central vacuum cleaning pipeline according to claim 1, wherein said second opening comprises the same features as said first opening.

11. The central vacuum cleaning pipeline according to claim 1, wherein said pipe has a first end wherein at least a portion of said first end is configured to be positioned adjacent said stop surface.

12. The central vacuum cleaning pipeline according to claim 11, wherein said first end of said pipe is configured to be positioned adjacent to said stop surface so that substantially no play exists between said first end of said pipe and said stop surface.

13. The central vacuum cleaning pipeline according to claim 1, wherein a vacuum cleaning unit is connected to said pipeline.

14. The central vacuum cleaning pipeline according to claim 1, wherein said annular recess is arranged at a second distance from said stop surface in the range of 7-20 mm.

15. The central vacuum cleaning pipeline according to claim 1, wherein each of said first and second openings comprises an attachment section as defined in claim 1.

* * * * *